(12) United States Patent
Komiyama et al.

(10) Patent No.: US 11,947,770 B2
(45) Date of Patent: Apr. 2, 2024

(54) DISPLAY CONTROL DEVICE, DISPLAY CONTROL METHOD, AND DISPLAY CONTROL PROGRAM

(71) Applicant: Nippon Telegraph and Telephone Corporation, Tokyo (JP)

(72) Inventors: Makoto Komiyama, Musashino (JP); Akira Kataoka, Musashino (JP); Hidetaka Koya, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/019,128

(22) PCT Filed: Aug. 7, 2020

(86) PCT No.: PCT/JP2020/030522
§ 371 (c)(1),
(2) Date: Feb. 1, 2023

(87) PCT Pub. No.: WO2022/030025
PCT Pub. Date: Feb. 10, 2022

(65) Prior Publication Data
US 2023/0297203 A1    Sep. 21, 2023

(51) Int. Cl.
*G06F 3/0481* (2022.01)
*G06F 3/14* (2006.01)

(52) U.S. Cl.
CPC .............. *G06F 3/0481* (2013.01); *G06F 3/14* (2013.01)

(58) Field of Classification Search
CPC .................................. G06F 3/0481; G06F 3/14
See application file for complete search history.

(56) References Cited

U.S. PATENT DOCUMENTS

2017/0249060 A1* 8/2017 Kubo .................... G06F 3/0482
2017/0287444 A1* 10/2017 Masuda ................ G06F 3/0485

FOREIGN PATENT DOCUMENTS

JP         2017072872        4/2017

* cited by examiner

*Primary Examiner* — Lisa S Landis
(74) *Attorney, Agent, or Firm* — Fish & Richardson P.C.

(57) ABSTRACT

A display control apparatus includes: a change detection unit that detects a change of a UI element on a target screen; a determination unit that determines a display update method among a plurality of display update methods for extended UIs based on the change of the UI element detected by the change detection unit; and a display update unit that updates display of the extended UIs by the display update method determined by the determination unit.

15 Claims, 15 Drawing Sheets

Fig. 2

| UPDATE PATTERN | DISPLAY UPDATE METHOD | DYNAMIC CHANGE DETECTION | UPDATE RANGE | DISPLAY REFLECTION TIMING | RISK OF DISPLAY DELAY OF TARGET SCREEN |
|---|---|---|---|---|---|
| PATTERN 1 | DETECT CHANGE OF UI ELEMENT AND UPDATE ONLY DISPLAY OF EXTENDED UI OF WHICH DISPLAY CONDITION CORRESPONDS TO CORRESPONDING UI | ○ | LOCAL | TIMING IMMEDIATELY AFTER DETECTION OF CHANGE OF UI ELEMENT | LARGE |
| PATTERN 2 | DETECT CHANGE OF UI ELEMENT AND UPDATE DISPLAY OF ALL EXTENDED UI AFTER ELAPSE OF CERTAIN TIME | ○ | ALL OF EXTENDED UI | TIMING WHEN CHANGE OF UI ELEMENT IS DETECTED AND CERTAIN TIME IS ELAPSED | INTERMEDIATE |
| PATTERN 3 | UPDATE DISPLAY OF ALL EXTENDED UI AFTER ELAPSE OF CERTAIN TIME, REGARDLESS OF CHANGE OF UI ELEMENT | × | ALL OF EXTENDED UI | TIMING AFTER ELAPSE OF CERTAIN TIME | SMALL |

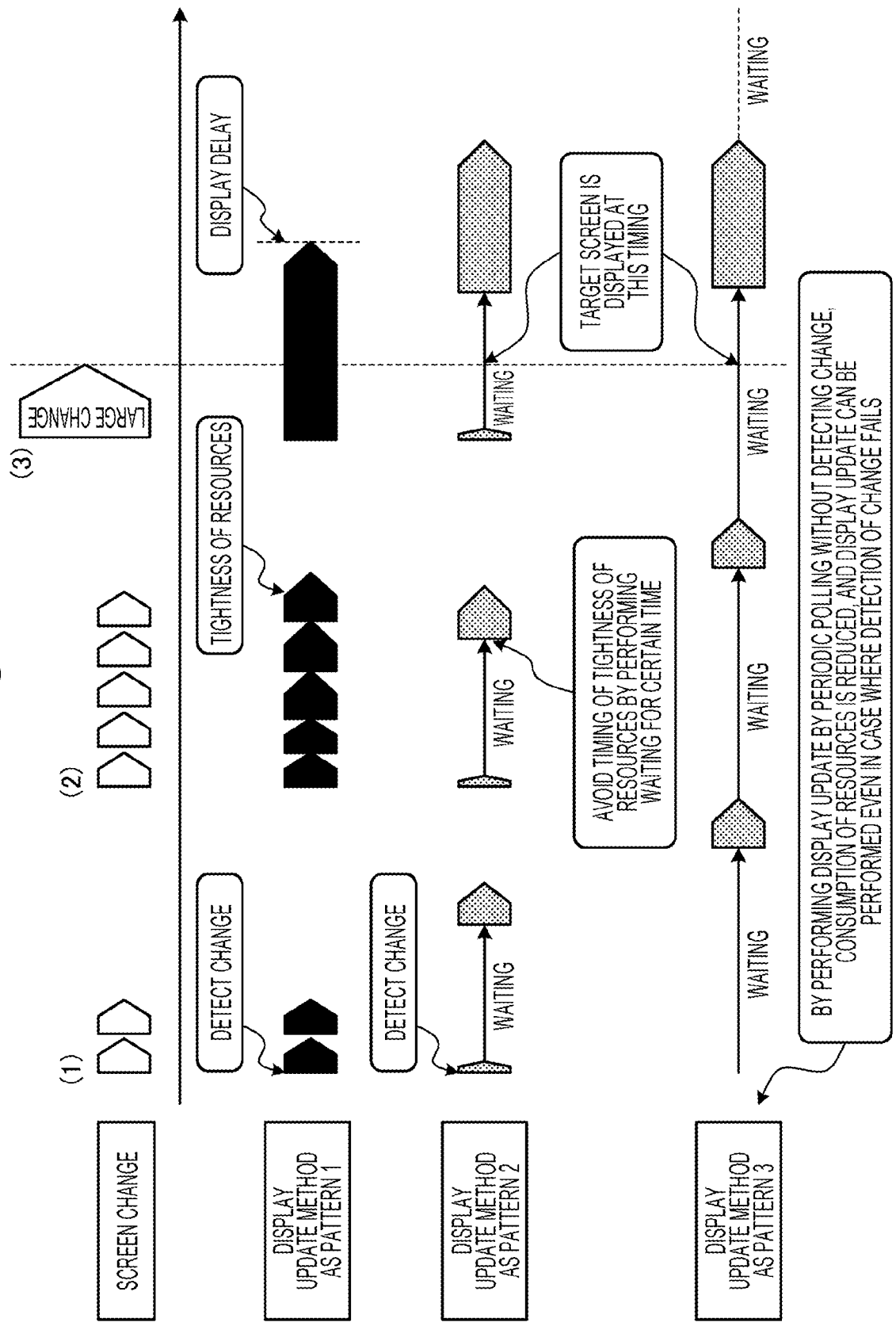

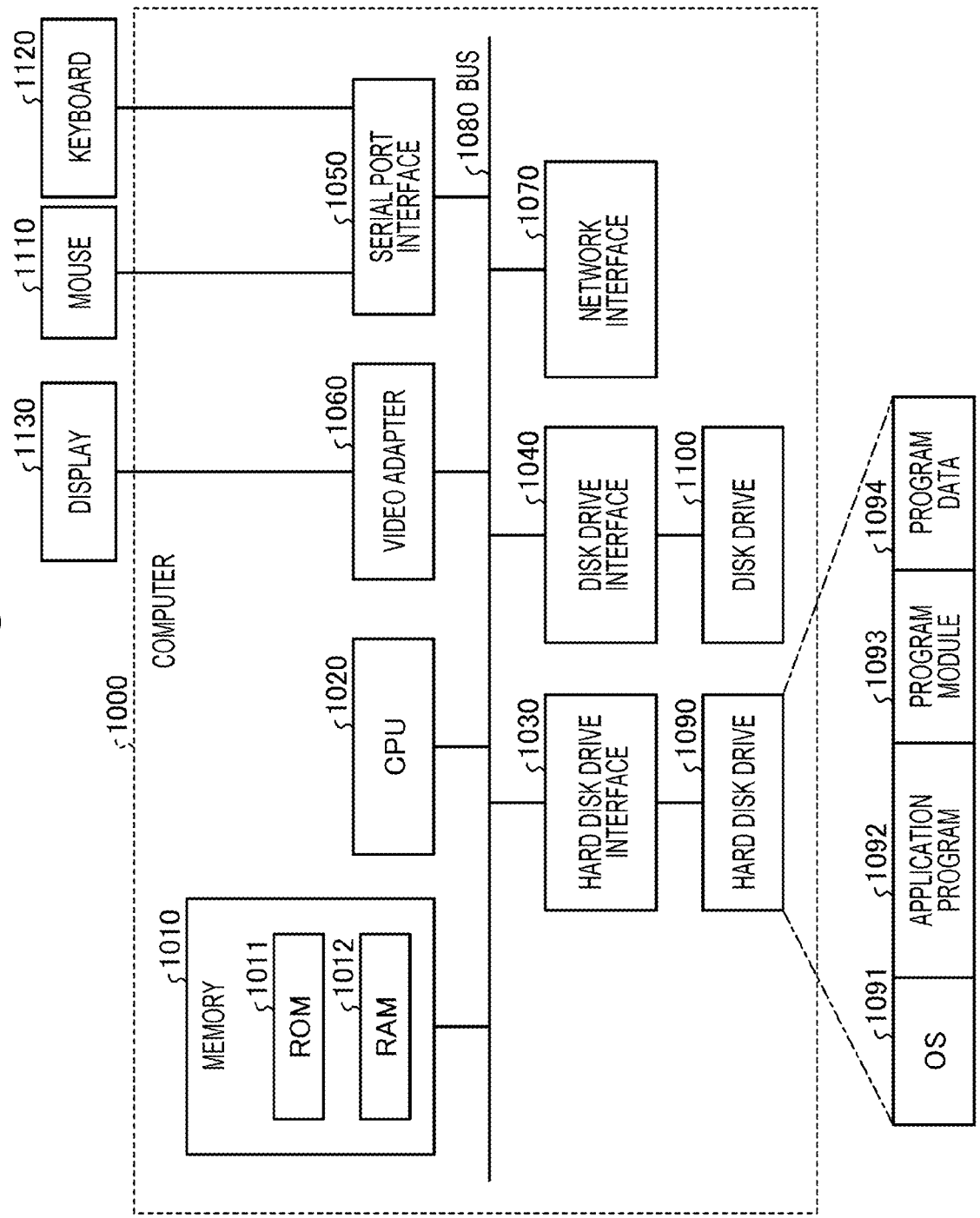

DISPLAY CONTROL DEVICE, DISPLAY CONTROL METHOD, AND DISPLAY CONTROL PROGRAM

CROSS-REFERENCE TO RELATED APPLICATIONS

This application is a National Stage application under 35 U.S.C. § 371 of International Application No. PCT/JP2020/030522, having an International Filing Date of Aug. 7, 2020. The disclosure of the prior application is considered part of the disclosure of this application, and is incorporated by reference in its entirety into this application.

TECHNICAL FIELD

The present invention relates to a display control apparatus, a display control method, and a display control program.

BACKGROUND ART

In the related art, in a general business system such as a web system, there is a UI extension technique that realizes productivity improvement by adding a user interface (UI) component having an input check function, an input automation function, and the like without developing a target application itself (refer to, for example, Patent Literature 1).

In a display control method used in the UI extension technique, in a case where a UI element (base point UI) serving as a base point of display designated by a user is displayed on a screen, a UI component (extended UI) associated with the base point UI is displayed.

In addition, in the display control method, even in a case where the screen display is dynamically changed, display of the extended UI is switched according to the presence or absence of display of the designated base point UI. For example, the base point UI is not displayed by scrolling of the display screen, and the extended UI is also not displayed. At this time, processing of specifying a scroll element, detecting a scroll event, determining whether or not a base point UI is within a display area of a window, and non-displaying an extended UI in a case where the base point UI is outside the area is performed.

In addition, for example, the base point UI is not displayed by processing of the target screen itself such as clicking of the screen, and the extended UI is also not displayed. At this time, a changed element among elements of the target screen is detected and searched for, and display or non-display of the extended UI is updated based on the detected element. Further, at this time, in a case where a changed or added element includes a scroll element, processing of detecting a scroll event and processing of updating a display position of the scroll event are also performed.

Further, in the display control method, there is a case where it is desired to set the base point UI as a display condition which is not unique. For example, annotation for calling attention may be displayed as an extended UI for all the UIs having a tag "value="attention"" among DIV tags. In addition, when a UI displayed in a table or a record format is set as a base point UI, although UI information such as a display position and an ID is not unique, an extended UI may be displayed for all UIs corresponding to a display condition. At this time, a changed element among elements of the target screen is detected and searched for, and display or non-display of the extended UI is updated based on the detected element.

In the display control method described above, basically, a changed element among elements of the target screen is detected and searched for, and display or non-display of the extended UI is updated based on the detected element. In the method, it is necessary to acquire and search for information of the changed UI element on the target screen. Specifically, it is necessary to determine whether or not the changed element includes a scroll element and whether or not the changed element includes an element matching with the display condition of the extended UI.

CITATION LIST

Patent Literature

Patent Literature 1: JP 2017-72872 A

SUMMARY OF INVENTION

Technical Problem

However, in the technique in the related art, there is a problem that a large-scale change or a high-frequency change of UI elements on a target screen causes a tightness of terminal resources and a display delay of the target screen when the UI extension is applied. For example, in a case where the number of changed UI elements is large, or in a case where the screen display is frequently changed, by acquiring and searching for information of the changed element, a tightness of terminal resources and a display delay of the target screen are caused.

In particular, in a terminal used only for business, a low-specification terminal is used in terms of cost, and for this reason, a change of a UI element as described above may cause a processing delay of the terminal. Further, a web browser basically operates in single-threaded and follows a change of the target screen. For this reason, in a case where a large amount of search processing is performed, display processing is not started and a display delay of the target screen is caused.

Solution to Problem

In order to solve the above-described problems, according to the present invention, there is provided a display control apparatus including: a change detection unit that detects a change of a UI element on a target screen; a determination unit that determines a display update method among a plurality of display update methods for extended UIs based on the change of the UI element detected by the change detection unit; and a display update unit that updates display of the extended UIs by the display update method determined by the determination unit.

Advantageous Effects of Invention

According to the present invention, even in a case where large-scale changes of UI elements on a target screen occur or UI elements change with a high frequency, it is possible to reduce a tightness of terminal resources and a display delay of a target screen when UI extension is applied.

BRIEF DESCRIPTION OF DRAWINGS

FIG. 2 is a diagram illustrating content of each display update method according to the first embodiment.

FIG. 3 is a diagram illustrating an example of a flow of processing of each display update method according to the first embodiment.

FIG. 15 is a diagram illustrating a computer that executes a program.

DESCRIPTION OF EMBODIMENTS

Hereinafter, embodiments of a display control apparatus, a display control method, and a display control program according to the present invention will be described in detail with reference to the drawings. Note that the present invention is not limited to the embodiments described below.

First Embodiment

Hereinafter, an outline of the display control apparatus, a configuration of the display control apparatus, types of display update methods, processing of each display update method, a flow of display update processing, and a flow of change tendency measurement processing according to the present embodiment will be described in order, and finally, effects of the present embodiment will be described.

[Outline of Display Control Apparatus]

The display control apparatus according to the present embodiment is a display control apparatus that adopts a plurality of display update methods in order to make a UI element (extended UI) added to a screen by the UI expansion technique follow a dynamic change of a target screen and not to cause a display delay of the target screen. Further, the display control apparatus can determine a display update method according to a change tendency of the target screen and can determine a waiting time in display update processing by detecting the change tendency of the target screen.

The display control apparatus according to the present embodiment has the following two features. A first feature is to provide a plurality of display update methods for extended UIs because a change tendency of UI elements differs depending on a target screen. The second feature is to dynamically determine and change a display update method and a waiting time during display update processing by measuring the change tendency of the target screen.

The display control apparatus according to the present embodiment applies a display update method and the like according to the change tendency of the target screen as described above. Thereby, it is possible to reduce a display delay of the target screen and a tightness of terminal resources in a case where UI extension is applied. As a result, an appropriate display update method is applied, and thus it is possible to improve stability of a display function when UI extension is applied. Further, an appropriate display update method is applied according to the change tendency for each target screen, and thus it is possible to improve a display response of an extended UI in a case where a screen dynamically changes.

[Configuration of Display Control Apparatus]

Figure 1:
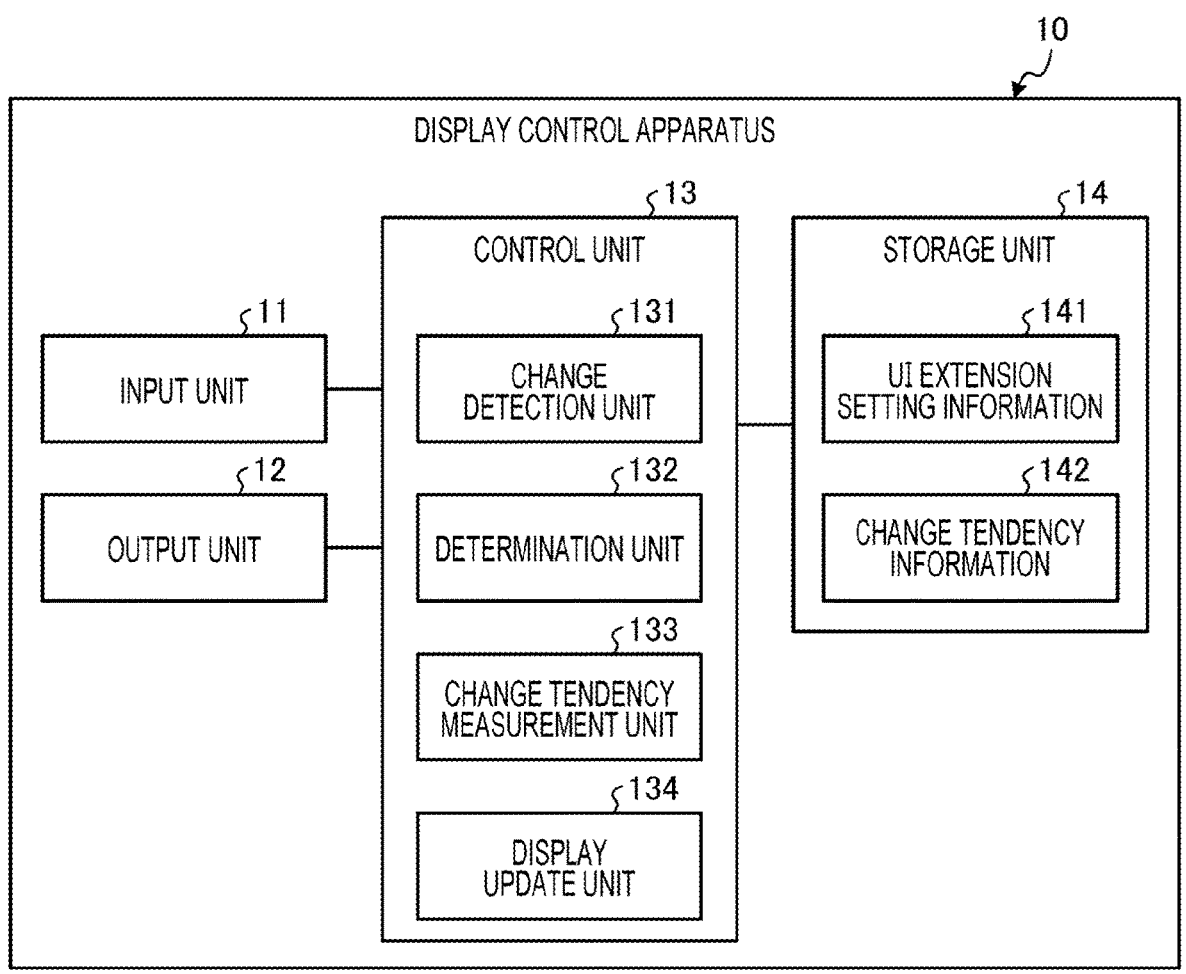
FIG. 1 is a block diagram illustrating a configuration example of a display update apparatus according to a first embodiment.

A configuration of a display control apparatus 10 according to the present embodiment will be described in detail with reference to FIG. 1. FIG. 1 is a block diagram illustrating a configuration example of a display control apparatus according to a first embodiment. The display control apparatus 10 includes an input unit 11, an output unit 12, a control unit 13, and a storage unit 14.

The input unit 11 inputs various types of information to the display control apparatus 10. The input unit 11 is, for example, a mouse, a keyboard, or the like, and receives an input of setting information or the like for the display control apparatus 10. Further, the output unit 12 outputs various types of information from the display control apparatus 10. The output unit 12 is, for example, a display or the like, and outputs setting information or the like recorded in the display control apparatus 10.

The control unit 13 controls the entire display control apparatus 10. The control unit 13 includes a change detection unit 131, a determination unit 132, a change tendency measurement unit 133, and a display update unit 134. Here, the control unit 13 is, for example, an electronic circuit such as a central processing unit (CPU) or a micro processing unit (MPU), or an integrated circuit such as an application specific integrated circuit (ASIC) or a field programmable gate array (FPGA).

The change detection unit 131 detects a change of a UI element on the target screen. In a case where the change detection unit 131 detects a change of a UI element, processing by the determination unit 132, the change tendency measurement unit 133, and the display update unit 134 is performed. In addition, in a case where display update is performed by a third display update method (pattern 3) to be described later, detection processing of a change of a UI element may be omitted.

The determination unit 132 determines a display update method among a plurality of display update methods for extended UIs based on the change of the UI element detected by the change detection unit 131. Specifically, the determination unit 132 determines at least one display update method among a first display update method (pattern 1) of updating only display of an extended UI corresponding to a UI element in a case where a change of a UI element is detected, a second display update method (pattern 2) of updating display of all extended UIs on a target screen in a case where a change of a UI element is detected and then a predetermined time is elapsed, and a third display update method (pattern 3) of updating display of all extended UIs on a target screen by periodic polling. A detailed description of the display update method will be given later as a type of the display update method and a flow of the display update processing.

In addition, the determination unit 132 determines a display update method by using a change tendency of UI elements, the change tendency being measured by the change tendency measurement unit 133. Specifically, the determination unit 132 determines a display update method by using at least one of a display update interval, a display update frequency, and the number of changed UI elements that are measured by the change tendency measurement unit 133. For example, the determination unit 132 determines a display update method by comparing the number of changed UI elements measured by the change tendency measurement unit 133 with a threshold value of a change amount of the UI elements, the threshold value being one of UI extension setting information 141 to be described later and being stored in the storage unit 14.

The change tendency measurement unit 133 measures a change tendency of the UI elements from the changes of the UI elements, the changes being detected by the change detection unit 131. Specifically, the change tendency measurement unit 133 measures at least one of a display update interval, a display update frequency, and the number of changed UI elements. For example, the change tendency measurement unit 133 measures the number of changed UI elements for a certain period of time, and stores a maximum value, a minimum value, and an average value of the number of changed UI elements, as change tendency information 142 to be described later, in the storage unit 14. The change tendency measurement processing will be described later in detail as a flow of the change tendency measurement processing.

The display update unit 134 updates display of the extended UI by the display update method determined by the determination unit 132. In addition, the display update unit 134 further determines a waiting time until the display of the extended UI is updated, by using at least one of the display update interval, the display update frequency, and the number of changed UI elements which are measured by the change tendency measurement unit 133. For example, the display update unit 134 determines a waiting time until the display of the extended UI is updated, based on an average value of the display update interval and an average value of the display update frequency that are stored in the storage unit 14 as change tendency information 142 to be described later.

The storage unit 14 stores various types of information referred to when the control unit 13 operates and various types of information acquired when the control unit 13 operates. The storage unit 14 includes an area for storing the UI extension setting information 141 and the change tendency information 142. Here, the storage unit 14 is, for example, a semiconductor memory element such as a RAM or a flash memory, or a memory device such as a hard disk or an optical disk. Note that, in the example of FIG. 1, the storage unit 14 is provided inside the display control apparatus 10. On the other hand, the storage unit 14 may be provided outside the display control apparatus 10. In addition, a plurality of storage units may be provided.

The UI extension setting information 141 is information used in a case where the display control apparatus 10 displays the extended UI and performs display update. The UI extension setting information 141 includes, for example, a display condition of the extended UI, a threshold value of a change amount of the UI elements, an initial value in a display update method, a threshold value for determining a display update method, and the like.

The change tendency information 142 is information measured or calculated by the change tendency measurement unit 133. The change tendency information 142 includes, for example, a display update interval, a display update frequency per unit time, the number of changed UI elements, and the like, which are measured. In addition, the change tendency information 142 includes a maximum value, a minimum value, an average value, and the like of each of a display update interval, a display update frequency per unit time, and the number of changed UI elements, which are calculated using measurement values.

[Type of Display Update Method]

A type of the display update method according to the present embodiment will be described in detail with reference to FIG. 2 and FIG. 3. FIG. 2 is a diagram illustrating content of each display update method according to the first embodiment. Further, FIG. 3 is a diagram illustrating an example of a flow of processing of each display update method according to the first embodiment. The display update method according to the present embodiment includes a first display update method (pattern 1), a second display update method (pattern 2), and a third display update method (pattern 3).

In the first display update method, a change of a UI element on a target screen is detected, and only display update of an extended UI of which a display condition corresponds to the corresponding UI is performed. Therefore, the first display update method corresponds to dynamic change detection, an update range is local, and display reflection is immediately performed in response to a change of a UI element. Further, a risk such as a display delay of a target screen is large (refer to a pattern 1 of FIG. 2).

In the first display update method, in a case where a normal screen change occurs (refer to (1) of FIG. 3), display update processing can be performed without a display delay or the like. On the other hand, in a case where UI elements change with a high frequency, that is, in a case where screen display changes frequently (refer to (2) of FIG. 3), a tightness of terminal resources is caused. In addition, in a case where large-scale changes of UI elements occur, that is, in a case where large amounts of change of UI elements occur (refer to (3) of FIG. 3), the target screen is not displayed until the display update processing of the extended UI is completed, and as a result, a display delay or the like of the target screen is caused (refer to a pattern 1 of FIG. 3). Here, large amounts of change of UI elements mean, for example, that the number of changed UI elements per unit time is large or a difference in changed area of the screen before and after the changes is large.

In the second display update method, changes of UI elements on a target screen are detected, and display of all the extended UIs is updated after a certain time is elapsed. Therefore, the second display update method corresponds to dynamic change detection, an update range includes all the extended UIs, and display reflection is performed in response to a change of a UI element after a certain time is elapsed. In addition, a risk such as a display delay of a target screen is intermediate (refer to a pattern 2 of FIG. 2).

Unlike the first display update method, in the second display update method, even in a case where UI elements change with a high frequency (refer to (2) in FIG. 3), after the changes are detected, waiting is performed for a certain time. Thus, it is possible to avoid a timing of a tightness of resources. Further, even in a case where a large-scale change of a UI element occurs (refer to (3) of FIG. 3), after display update processing is started, waiting is performed for a certain time. Thus, a display delay does not occur (refer to a pattern 2 of FIG. 3). Note that the waiting time until display update processing is performed can be statically or dynamically changed by initial setting or based on the measurement value by the change tendency measurement unit 133.

In the third display update method, regardless of whether or not a UI element on a target screen is changed, display of all the extended UIs is updated after a certain time is elapsed. Therefore, the third display update method does not correspond to dynamic change detection, an update range includes all the extended UIs, and display reflection is performed after a certain time is elapsed regardless of a change of a UI element. Further, a risk such as a display delay of a target screen is small (refer to a pattern 3 of FIG. 2).

Unlike the first display update method, in the third display update method, even in a case where UI elements change with a high frequency (refer to (2) in FIG. 3), display update is performed by regular polling. Thus, it is possible to reduce consumption of terminal resources. Further, even in a case where a large-scale change of a UI element occurs (refer to (3) of FIG. 3), after display update processing is started, waiting is performed for a certain time. Thus, a display delay does not occur. Further, since display update is performed regardless of a change of a UI element, even in a case where detection of a change fails, display can be updated (refer to a pattern 3 of FIG. 3). Note that the waiting time until display update processing is performed can be statically or dynamically changed by initial setting or based on the measurement value by the change tendency measurement unit 133.

[Processing of First Display Update Method]

Figure 4:
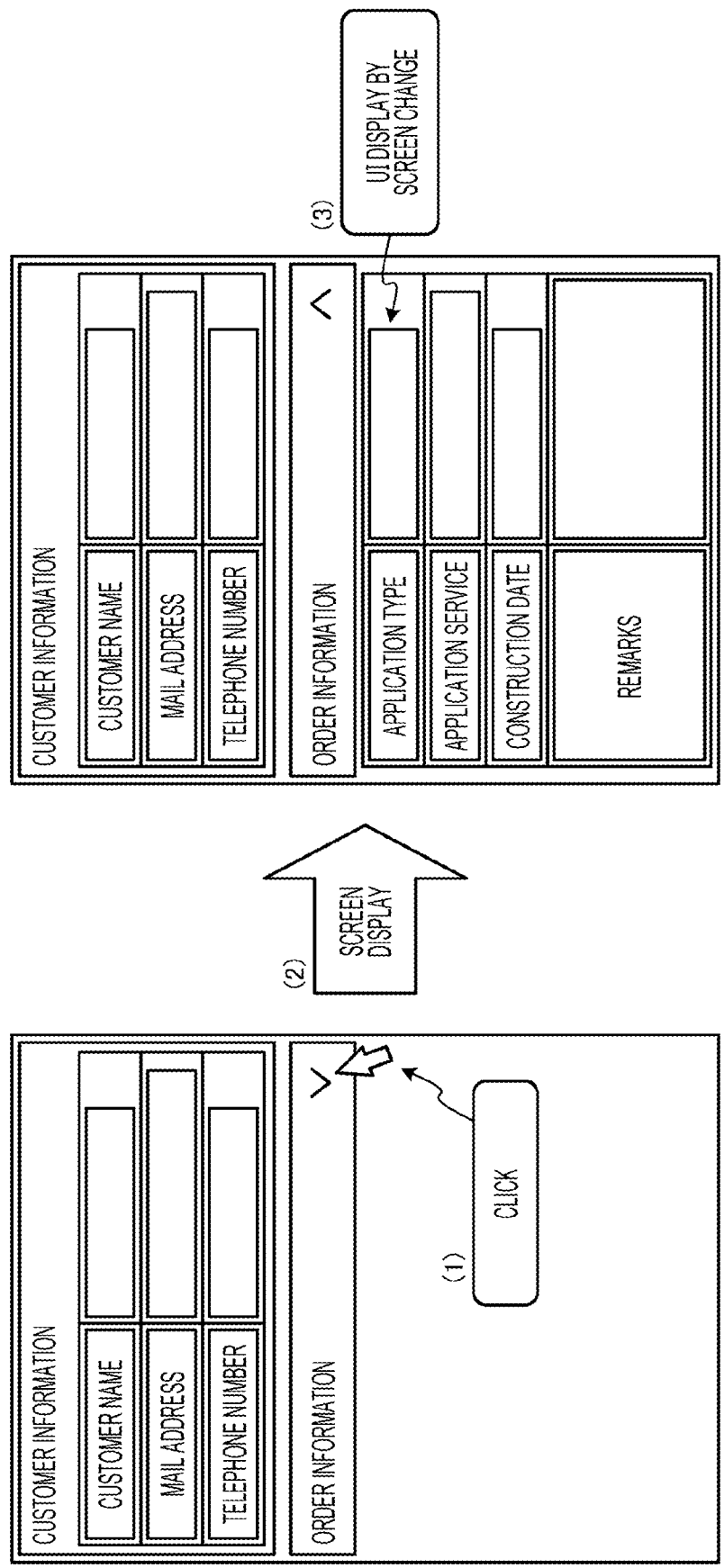
FIG. 4 is a diagram illustrating an example of a change of a UI element according to the first embodiment.

Processing of the first display update method (pattern 1) according to the present embodiment will be described in detail with reference to FIG. 4 to FIG. 6. FIG. 4 is a diagram illustrating an example of a change of a UI element according to the first embodiment. In addition, FIG. 5 and FIG. 6 are diagrams illustrating an outline of the first display update method according to the first embodiment.

First of all, an example of basic display of a UI and non-display of a UI will be described with reference to FIG. 4. First, a user clicks a UI of a specific portion of "order information" on a target screen (refer to (1) of FIG. 4). Subsequently, a screen change of the target screen occurs (refer to (2) of FIG. 4), and UIs of "application type", "application service", "construction date", and "remarks", which are contents of hidden "order information", are displayed (refer to (3) of FIG. 4). On the other hand, in a case where the user clicks the UI of the specific portion of "order information" on the target screen again, the content of "order information" is not displayed by being hidden.

Next, an outline of the first display update method in a case where a tightness of terminal resources or a display delay does not occur will be described with reference to FIG. 5. In FIG. 5, a base point UI (1) for displaying a sticky-note-type extended UI is applied to an input field of "customer name" which is content of "customer information" on the target screen. In addition, a base point UI (2) for displaying a label-type extended UI is applied to an input field of "application type" which is content of "order information". Here, since the base point UI (1) is displayed on the target screen, the sticky-note-type extended UI is displayed. On the other hand, since the base point UI (2) is not displayed on the target screen, the label-type extended UI is not displayed.

Figure 5:
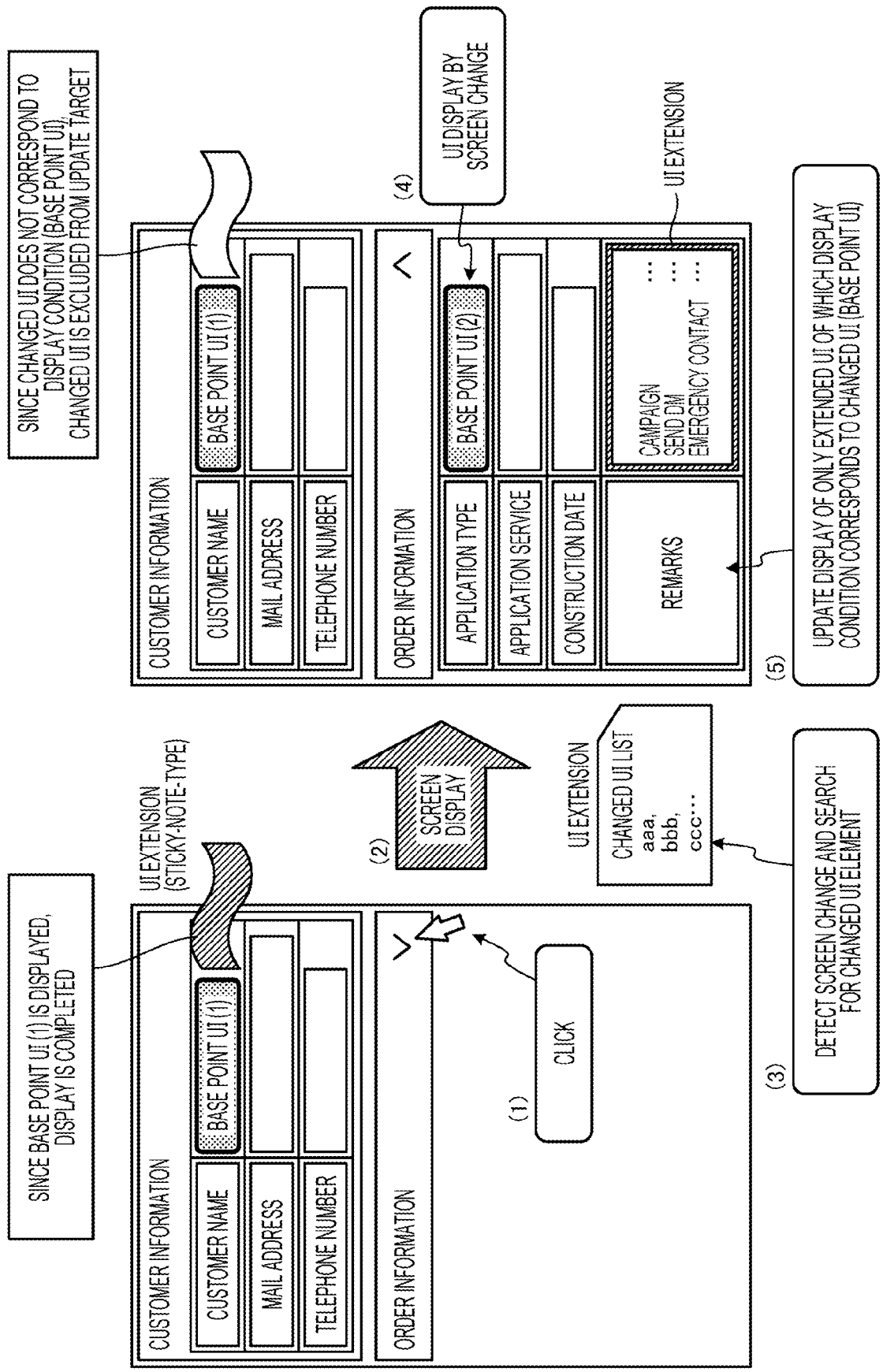
FIG. 5 is a diagram illustrating an outline of a first display update method according to the first embodiment.
Figure 6:
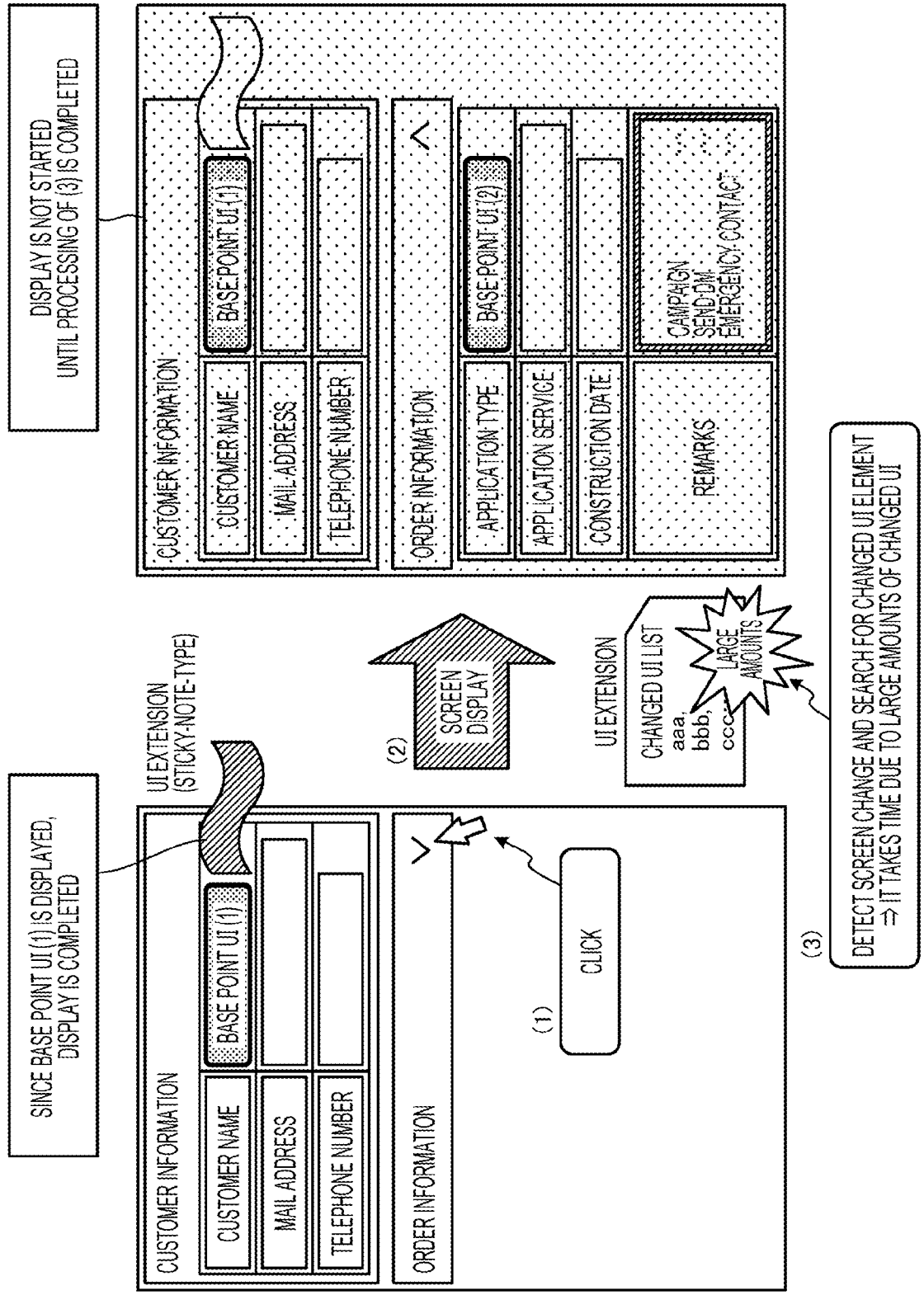
FIG. 6 is a diagram illustrating an outline of a first display update method according to the first embodiment.

First, in a case where the user clicks the UI of the specific portion of "order information" on the target screen (refer to (1) of FIG. 5), a screen change of the target screen occurs (refer to (2) of FIG. 5). At this time, a screen change is detected, and a changed UI element is searched for (refer to (3) of FIG. 5). Next, the base point UI (2) applied to "application type" which is content of "order information" is displayed (refer to (4) of FIG. 5). Finally, display of only the extended UI using the changed UI as a display condition (base point UI) is updated (refer to (5) of FIG. 5). In the example of FIG. 5, display of only the label-type extended UI applied to the base point UI (2) is updated. On the other hand, since the sticky-note-type extended UI applied to the base point UI (1) is not changed, display of the sticky-note-type extended UI is not updated. Further, in addition to the screen change by the processing on the target screen itself as in the example of FIG. 5, in a case where the user scrolls the target screen or a UI element on the target screen and then a display state of the base point UI is changed due to the scrolling, display of the extended UI is similarly updated. In the example of FIG. 5, a change of the UI element when the screen change occurs is small, and a display delay or the like due to search for the changed UI element does not occur.

Finally, an outline of the first display update method in a case where a display delay or the like occurs will be described with reference to FIG. 6. In FIG. 6, similarly to FIG. 5, a base point UI (1) for displaying a sticky-note-type extended UI is applied to an input field of "customer name" which is content of "customer information" on the target screen. In addition, a base point UI (2) for displaying a label-type extended UI is applied to an input field of "application type" which is content of "order information". On the other hand, compared to FIG. 5, it is assumed that a large number of items exist in the content of "order information".

First, in a case where the user clicks the UI of the specific portion of "order information" on the target screen (refer to (1) of FIG. 6), a screen change of the target screen occurs (refer to (2) of FIG. 6). At this time, a screen change is detected, and a changed UI element is searched for. On the other hand, since a large number of changed UIs exist, it takes a time to detect and search for the changed UIs (refer to (3) of FIG. 6). Until this processing is completed, screen display is not started. As a result, a display delay or the like of the target screen occurs.

[Processing of Second Display Update Method]

Figure 7:
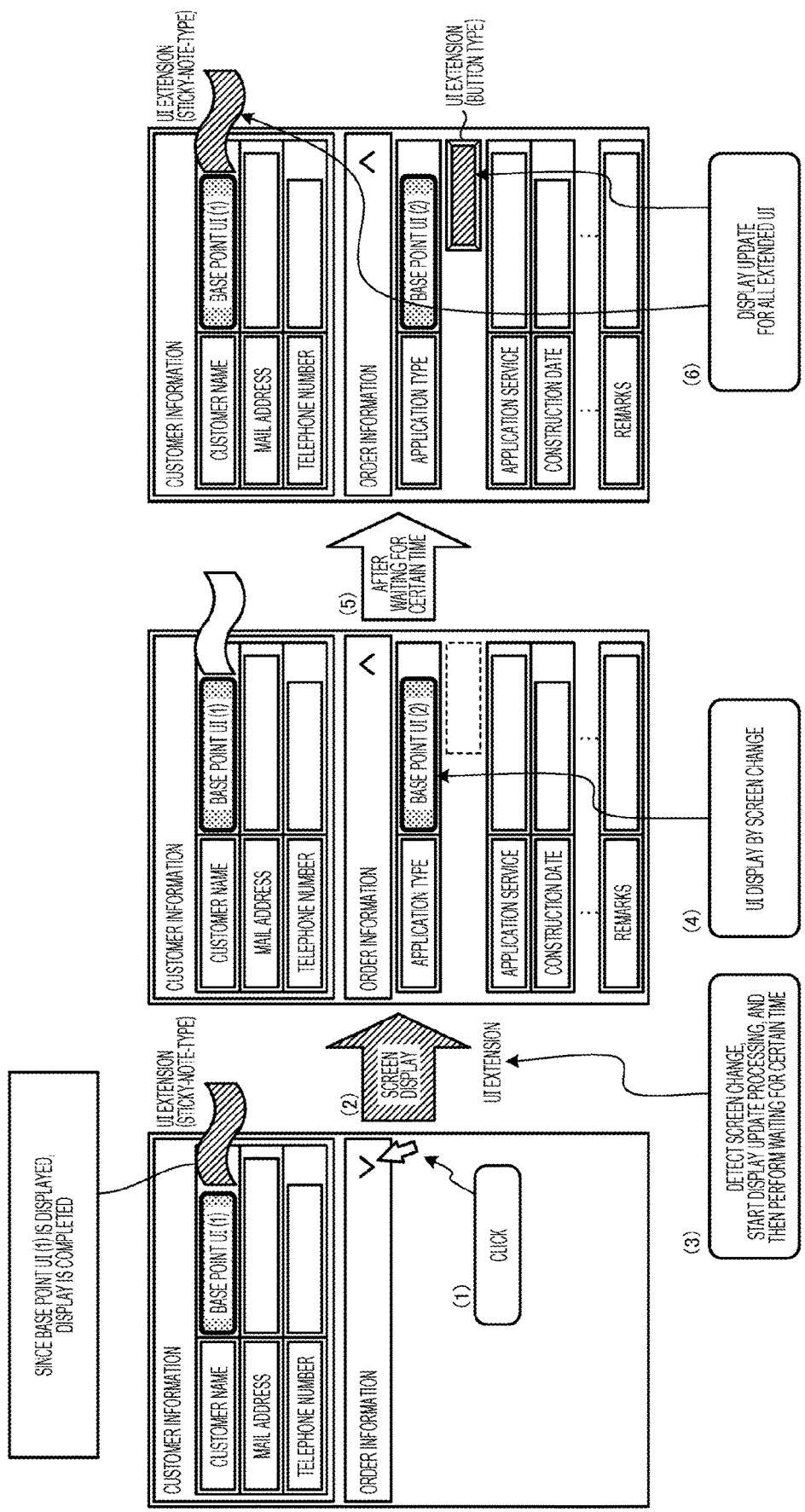
FIG. 7 is a diagram illustrating an outline of a second display update method according to the first embodiment.
Figure 8:
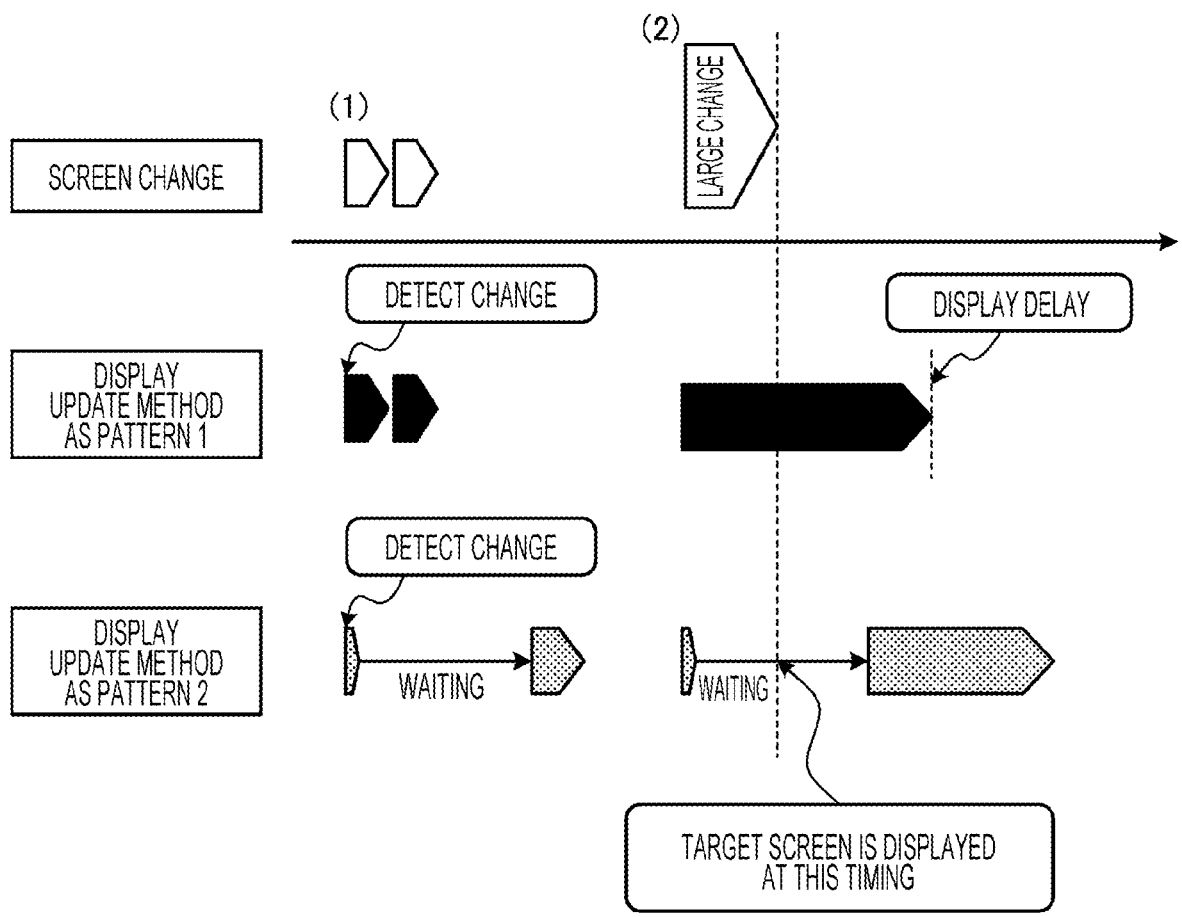
FIG. 8 is a diagram illustrating an example of flows of pieces of processing of the first display update method and the second display update method according to the first embodiment.
Figure 9:
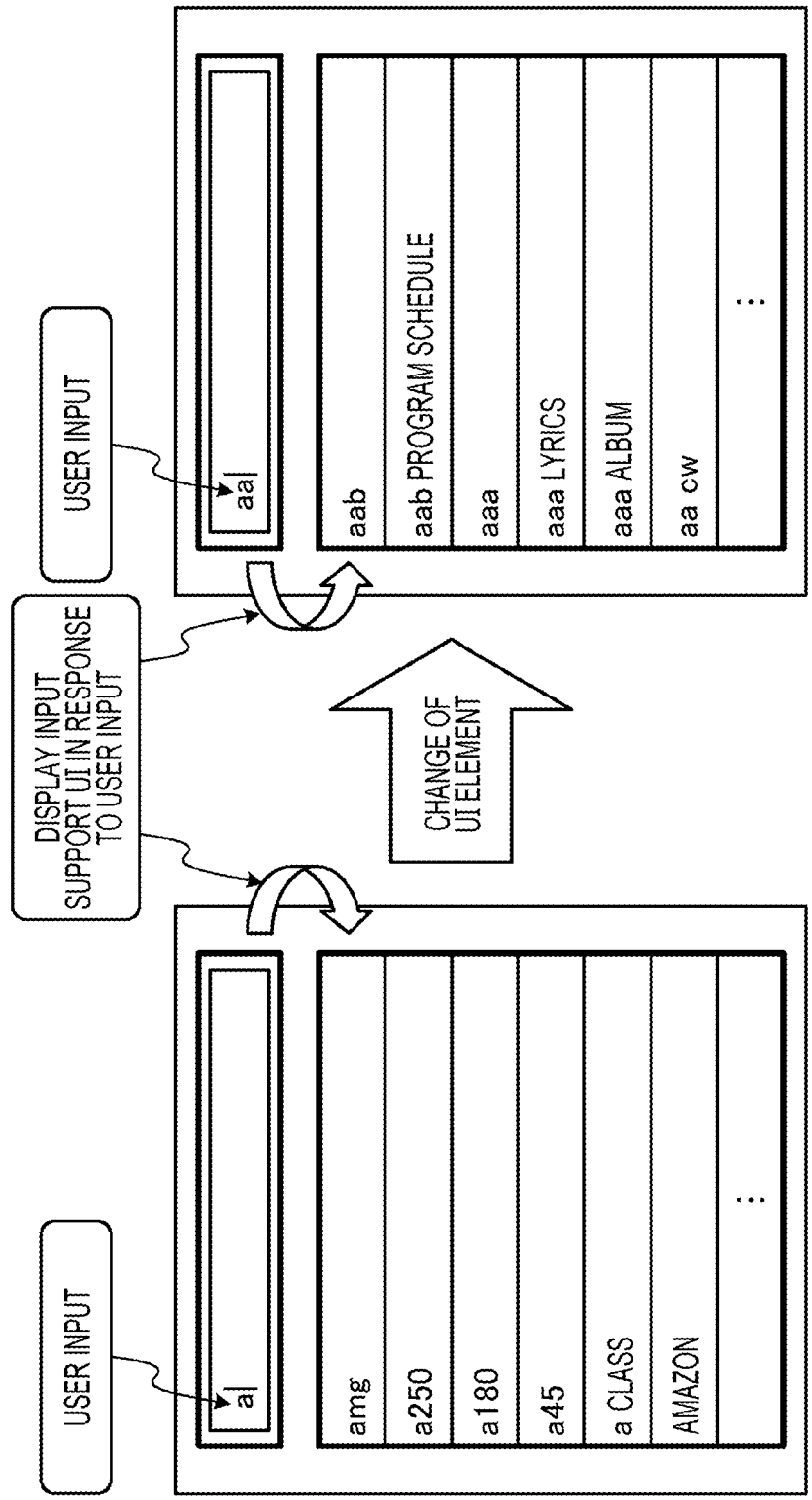
FIG. 9 is a diagram illustrating an example of a change of a UI element according to the first embodiment.
Figure 10:
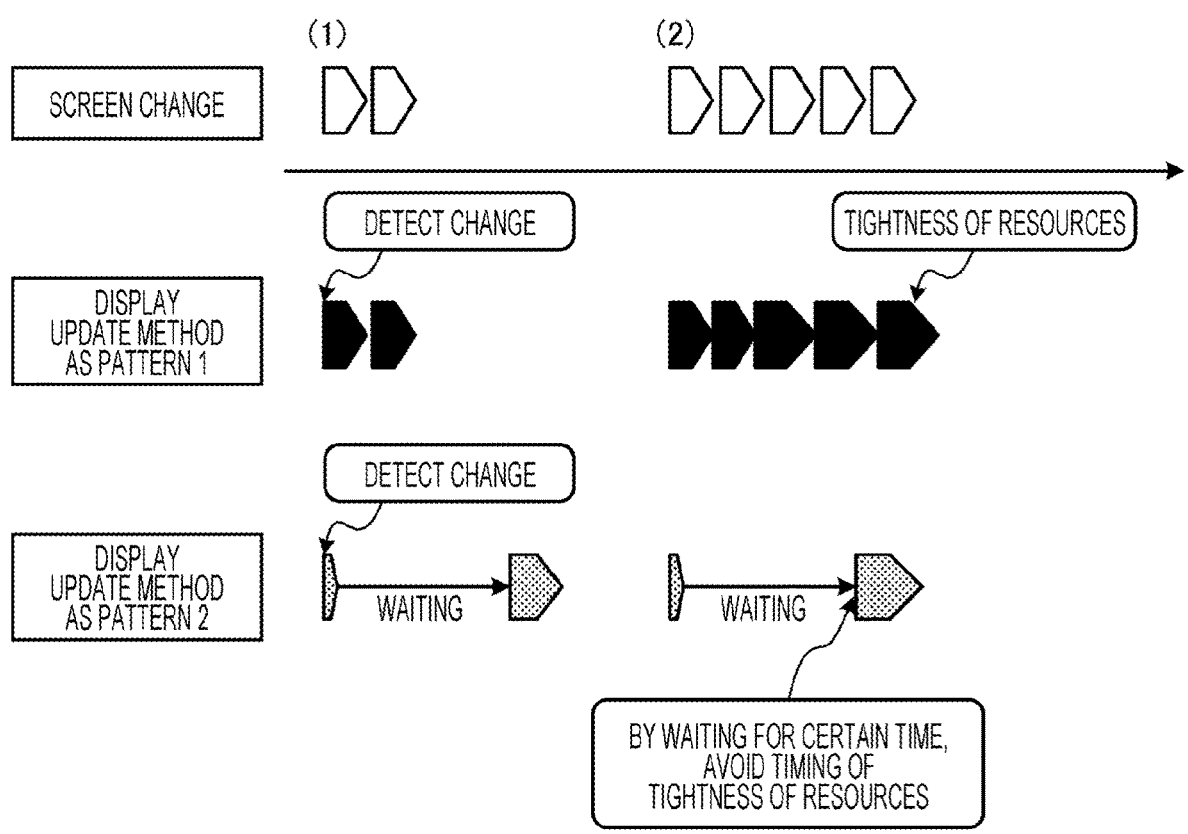
FIG. 10 is a diagram illustrating an example of flows of pieces of processing of the first display update method and the second display update method according to the first embodiment.
Figure 11:
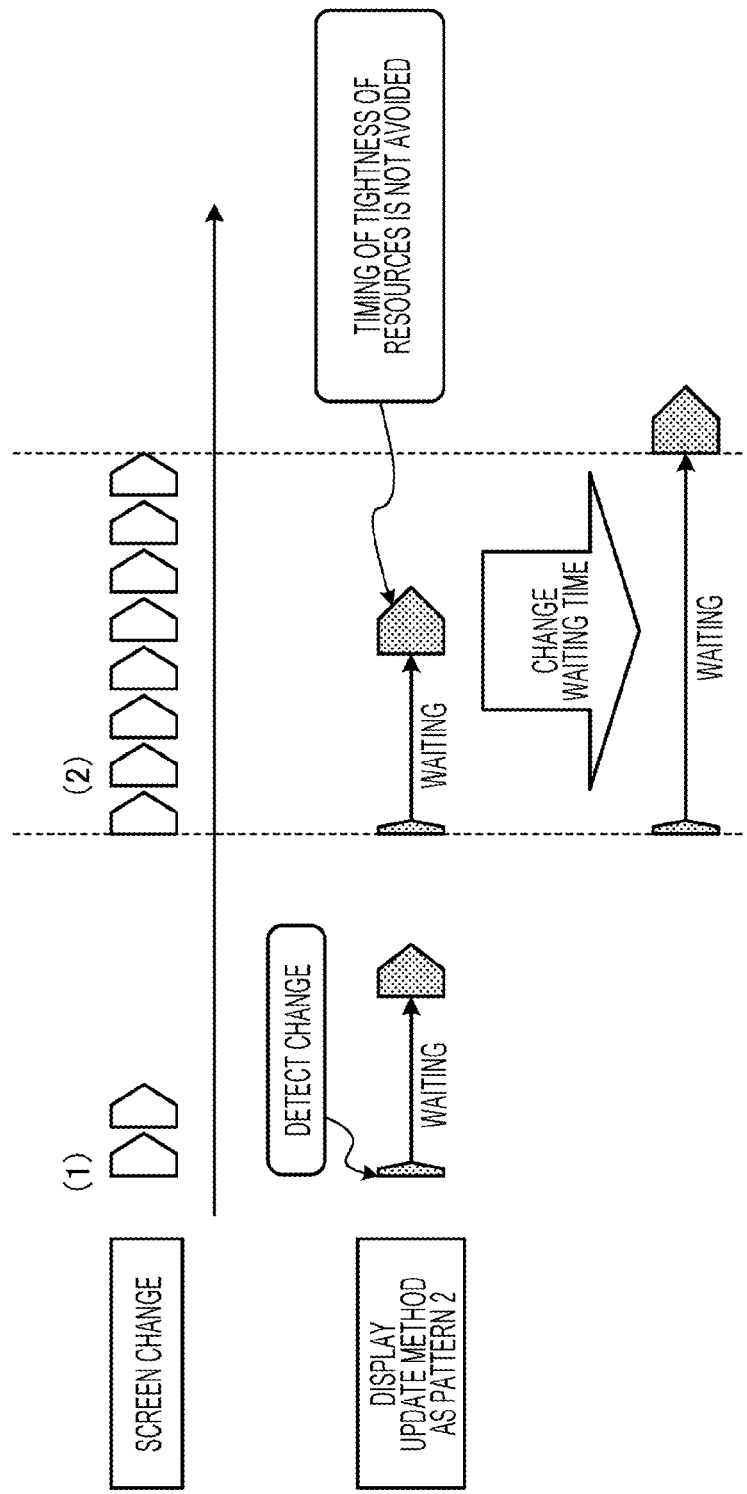
FIG. 11 is a diagram illustrating an example of a flow of processing of the second display update method according to the first embodiment.

Processing of the second display update method (pattern 2) according to the present embodiment will be described in detail with reference to FIG. 7 to FIG. 11. FIG. 7 is a diagram illustrating an outline of the second display update method according to the first embodiment. FIG. 8 is a diagram illustrating an example of flows of pieces of processing of the first display update method and the second display update method according to the first embodiment. FIG. 9 is a diagram illustrating an example of a change of a UI element according to the first embodiment. FIG. 10 is a diagram illustrating an example of flows of pieces of processing of the first display update method and the second display update method according to the first embodiment. FIG. 11 is a diagram illustrating an example of a flow of processing of the second display update method according to the first embodiment.

First, an outline of the second display update method in a case where a large number of UI elements change will be described with reference to FIG. 7 and FIG. 8. In FIG. 7, similarly to FIG. 6, a base point UI (1) for displaying a sticky-note-type extended UI is applied to an input field of "customer name" which is content of "customer information" on the target screen. In addition, a base point UI (2) for displaying a button-type extended UI is applied to an input field of "application type" which is content of "order information". Similarly to FIG. 6, it is assumed that a large number of items exist in the content of "order information".

First, in a case where the user clicks the UI of the specific portion of "order information" on the target screen (refer to (1) of FIG. 7), a screen change of the target screen occurs (refer to (2) of FIG. 7). At this time, after a screen change is detected and then display update processing is started, waiting is performed for a certain time (refer to (3) of FIG. 7). Here, UI display is performed by the screen change (refer to (4) of FIG. 7), waiting is performed for a certain time after the detection of the screen change (refer to (5) of FIG. 7), and display update processing for all the extended UIs is performed (refer to (6) of FIG. 7).

Further, a difference in processing between the first display update method and the second display update method will be described with reference to FIG. 8. In the first display update method, in a case where a large number of UI elements change (refer to (2) of FIG. 8), it takes a time to detect and search for the changed UI elements. As a result, a display delay or the like of the target screen is caused (refer to a pattern 1 of FIG. 8). On the other hand, in the second display update method, unlike the first display update method, search processing of the changed UI elements is not performed. Thus, display of the target screen is performed immediately after the screen change (refer to a pattern 2 of FIG. 8).

Next, an outline of the second display update method in a case where UI elements change with a high frequency will be described with reference to FIG. 9 to FIG. 11. FIG. 9 is a diagram illustrating an example in which UI elements change with a high frequency, and illustrates a screen in which UI elements change in response to a user operation. For example, the screen illustrates a predictive search function of a search engine used in a web browser. In this function, each time a user inputs a text, an input support UI is displayed in response to the user input. Even in such a case where UI elements change with a high frequency, processing similar to the processing in a case where a large number of UI elements described above change is performed.

Further, a difference in processing between the first display update method and the second display update method will be described with reference to FIG. 10. In the first display update method, in a case where UI elements change with a high frequency (refer to (2) of FIG. 10), each time the changed UI element is detected, display update processing is performed by searching of the changed UIs. The web browser basically operates in single-threaded, and thus display update processing of the UI extension is stacked. As a result, execution of screen drawing processing is delayed, and a tightness or the like of terminal resources is caused (refer to a pattern 1 of FIG. 10). On the other hand, unlike the first display update method, in the second display update method, after changes of UI elements are detected, waiting is performed for a certain time in the processing. Thus, it is possible to avoid a timing of a tightness of resources (refer to a pattern 2 of FIG. 10).

Further, display update processing is executed with a waiting time which is set in advance as an initial value. On the other hand, in a case where the screen change continues for a time longer than the waiting time having the initial value, a timing of a tightness of terminal resources may not be avoided (refer to a pattern 2 of FIG. 11). As a countermeasure for the above, the waiting time may be dynamically changed using the change tendency calculated by the change tendency measurement unit 133. For example, a waiting time may be determined from a product of an average value of the display update interval and an average value of the display update frequency, and the waiting time may be changed to the determined waiting time.

[Processing of Third Display Update Method]

Figure 12:
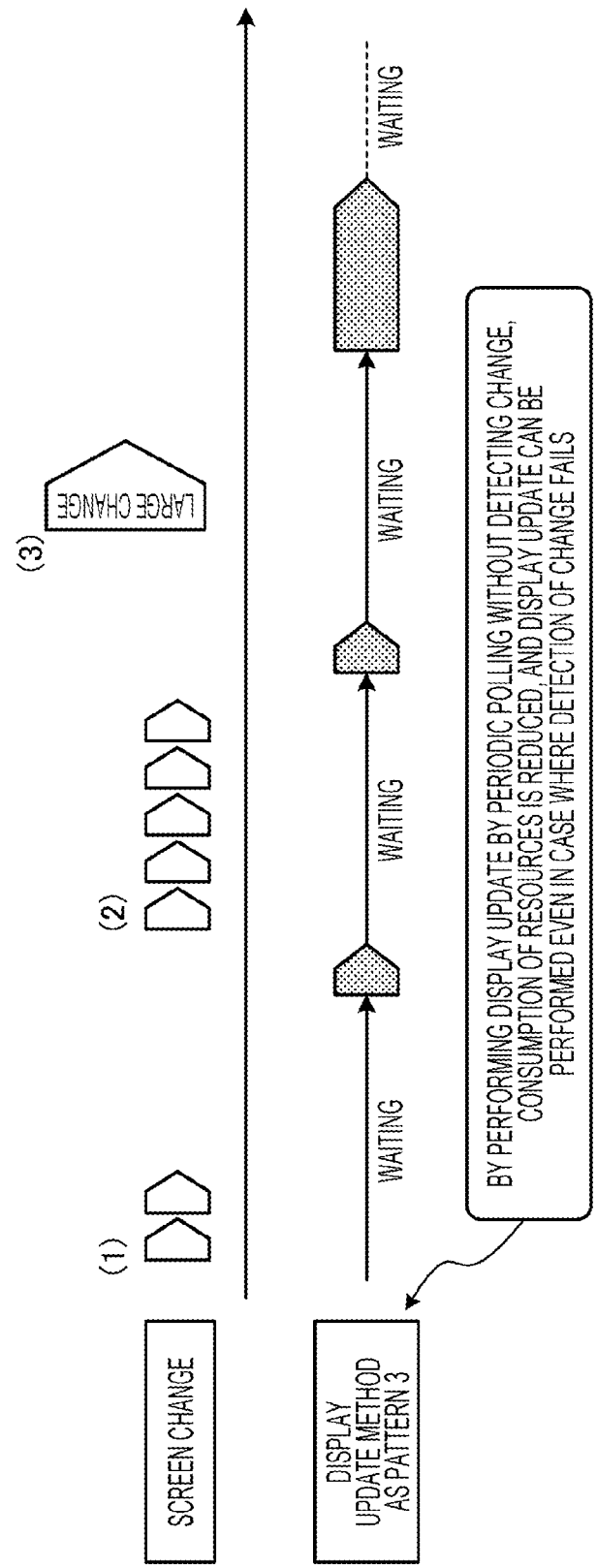
FIG. 12 is a diagram illustrating an example of a flow of processing of a third display update method according to the first embodiment.

Processing of the third display update method (pattern 3) according to the present embodiment will be described in detail with reference to FIG. 12. FIG. 12 is a diagram illustrating an example of a flow of processing of the third display update method according to the first embodiment.

In a case where the number of changed UI elements is extremely large, in a case where changed UI elements are not correctly detected due to an unexpected situation, in a case where it is desired to minimize consumption of terminal resources, or the like, display update is performed by using the third display update method.

In the third display update method, the screen change detection is not performed, and display update is performed after a certain time is elapsed (a pattern 3 of FIG. 12). Since screen change detection is not performed, immediate update according to a change cannot be performed. On the other hand, processing such as searching of the changed UIs according to the screen change detection is omitted, and thus display update can be performed with minimum consumption of resources. In addition, even in a case where screen change detection and searching of the changed UIs cannot be performed due to a certain cause, screen change detection and searching are not performed, and thus display update can be more stably performed. Further, the third display update method may be used in combination with the first display update method and the second display update method.

[Processing Procedure of Display Update]

Figure 13:
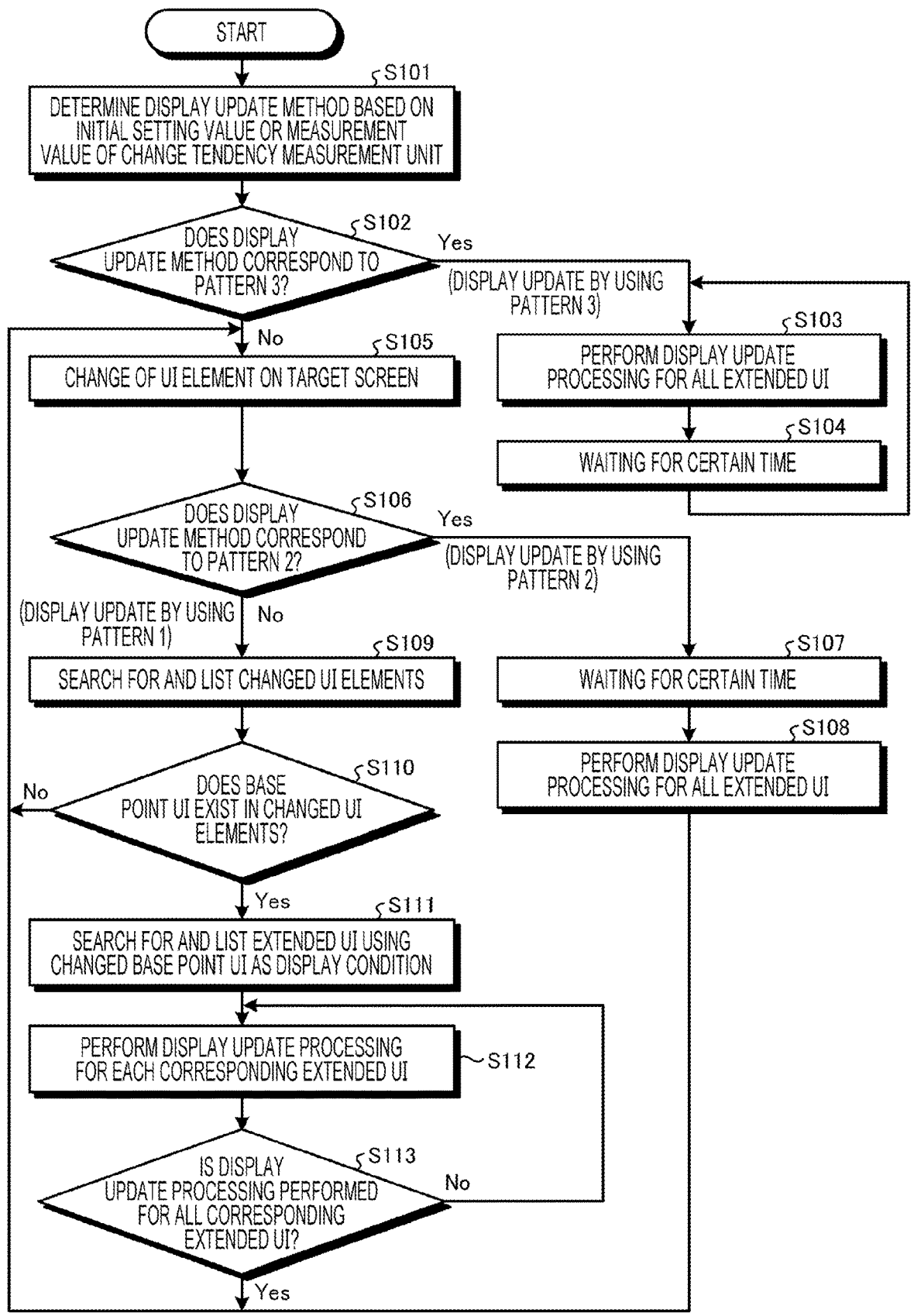
FIG. 13 is a flowchart illustrating an example of a flow of display update processing according to the first embodiment.

An example of a procedure of display update processing according to the present embodiment will be described with reference to FIG. 13. FIG. 13 is a flowchart illustrating an example of a flow of display update processing according to the first embodiment. First, as illustrated in FIG. 13, the determination unit 132 of the display control apparatus 10 determines a display update method based on an initial setting value or a measurement value of the change tendency measurement unit 133 (step S101).

At this time, in a case where the display update method is the third display update method (pattern 3) (Yes in step S102), the display update unit 134 performs display update processing for all the extended UIs (step S103). Next, display update processing is waited until a waiting time is elapsed (step S104), and the process returns to step S103, the waiting time being determined based on the initial setting value or the measurement value of the change tendency measurement unit 133.

On the other hand, in a case where the display update method is not the third display update method (pattern 3) (No in step S102), the change detection unit 131 detects changes of UI elements on a target screen (step S105). Note that the change detection processing of the UI elements by the change detection unit 131 may be performed by the third display update method (pattern 3) and is not particularly limited by the display update method.

Next, in a case where the display update method is the second display update method (pattern 2) (Yes in step S106), display update processing is waited until a waiting time is elapsed (step S107), the waiting time being determined based on the initial setting value or the measurement value of the change tendency measurement unit 133. Then, the display update unit 134 performs display update processing for all the extended UIs (step S108), and the process returns to step S105.

On the other hand, in a case where the display update method is not the second display update method (pattern 2) (No in step S106), the change detection unit 131 searches for and lists changed UI elements (step S109). Next, in a case where a base point UI does not exist in the changed UI elements (No in step S110), the process returns to step S105.

In a case where a base point UI exists in the changed UI elements (Yes in step S110), the change detection unit 131 searches for and lists extended UIs using a changed base point UI as a display condition (step S111). Next, the display update unit 134 performs display update processing for each corresponding extended UI (step S112).

In a case where display update processing is performed for all the corresponding extended UIs (Yes in step S113), the process returns to step S105. On the other hand, in a case where display update processing is not performed for all the corresponding extended UIs (No in step S113), the process returns to step S112.

[Processing Procedure of Change Tendency Measurement]

Figure 14:
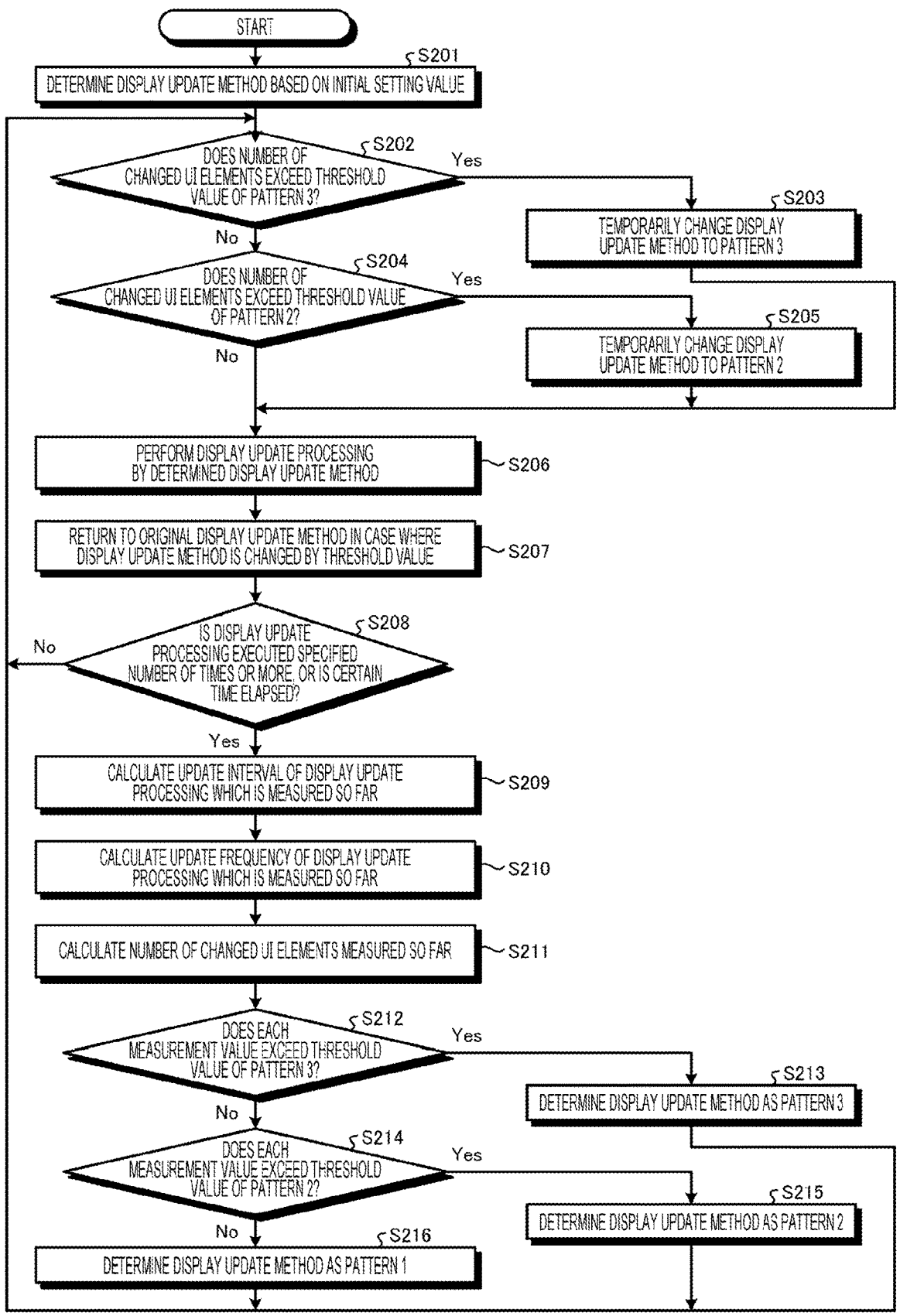
FIG. 14 is a flowchart illustrating an example of a flow of change tendency measurement processing according to the first embodiment.

An example of a procedure of change tendency measurement processing according to the present embodiment will be described with reference to FIG. 14. FIG. 14 is a flowchart illustrating an example of a flow of change tendency measurement processing according to the first embodiment. First, as illustrated in FIG. 14, the determination unit 132 of the display control apparatus 10 determines a display update method based on an initial setting value (step S201).

Next, in a case where the number of the changed UI elements measured by the change tendency measurement unit 133 exceeds a threshold value of the third display update method (pattern 3) (Yes in step S202), the determination unit 132 temporarily changes the display update method to the third display update method (pattern 3) (step S203). Then, the display update unit 134 performs display update by the third display update method (pattern 3) (step S206).

In a case where the number of the changed UI elements measured by the change tendency measurement unit 133 does not exceed the threshold value of the third display update method (pattern 3) (No in step S202) and the number of the changed UI elements measured by the change tendency measurement unit 133 exceeds the threshold value of the second display update method (pattern 2) (Yes in step S204), the determination unit 132 temporarily changes the display update method to the second display update method (pattern 2) (step S205). Then, the display update unit 134 performs display update by the second display update method (pattern 2) (step S206).

In a case where the number of the changed UI elements measured by the change tendency measurement unit 133 does not exceed the threshold value of the third display update method (pattern 3) (No in step S202) and the number of the changed UI elements measured by the change tendency measurement unit 133 does not exceed the threshold value of the second display update method (pattern 2) (No in step S204), the display update unit 134 performs display update by the first display update method (pattern 1) (step S206).

Note that the display update method determined by the initial setting value may be a plurality of display update methods. For example, the display update method may be a combination of the third display update method (pattern 3) and the first display update method (pattern 1) or a combination of the third display update method (pattern 3) and the second display update method (pattern 2). In addition, procedures of step S202 and step S204 may be omitted. For example, in a case where the display update method is determined as the third display update method (pattern 3) by the initial setting value, a procedure of step S202 may be omitted, and processing of step S204 may be performed.

Next, in a case where the display update method is changed by the determination of the threshold value (step S203, step S205, step S206), the determination unit 132 returns to the original display update method (step S207).

Subsequently, in a case where the display update processing is not executed a specified number of times or more which is set in advance, or in a case where a certain time which is set in advance is not elapsed (No in step S208), the process returns to step S202. Note that, in the above case (No in step S208), display update processing is performed only by the display update method determined by the initial setting value and processing of step S202 to step S207 may be omitted.

On the other hand, in a case where the display update processing is executed a specified number of times or more which is set in advance, or in a case where a certain time which is set in advance is elapsed (Yes in step S208), the change tendency measurement unit 133 performs change tendency calculation processing of step S209 to step S211.

The change tendency measurement unit 133 calculates a maximum value, a minimum value, an average value, and the like of the update interval of the display update processing that is measured so far (step S209). In addition, the change tendency measurement unit 133 calculates a maximum value, a minimum value, an average value, and the like of the update frequency per unit time of the display update processing that is measured so far (step S210). In addition, the change tendency measurement unit 133 calculates a maximum value, a minimum value, an average value, and the like of the number of the changed UI elements that is measured so far (step S211). Note that the order of the processing of step S209 to step S211 performed by the change tendency measurement unit 133 is an example and is not limited to the order of the processing of FIG. 14. Further, in the change tendency calculation processing of step S209 to step S211, a part of the processing may be omitted.

Next, in a case where each measurement value calculated by the change tendency measurement unit 133 exceeds a threshold value of the third display update method (pattern 3) (Yes in step S212), the determination unit 132 determines the display update method as the third display update method (pattern 3) (step S213). Further, in determination of the display update method, the display update unit 134 may determine a waiting time up to the display update processing, from each measurement value.

In a case where each measurement value calculated by the change tendency measurement unit 133 does not exceed the threshold value of the third display update method (pattern 3) (No in step S212) and each measurement value calculated by the change tendency measurement unit 133 exceeds the threshold value of the second display update method (pattern 2) (Yes in step S214), the determination unit 132 determines the display update method as the second display update method (pattern 2) (step S215). Further, in determination of the display update method, the display update unit 134 may determine a waiting time up to the display update processing, from each measurement value.

In a case where each measurement value calculated by the change tendency measurement unit 133 does not exceed the threshold value of the third display update method (pattern 3) (No in step S212) and each measurement value calculated by the change tendency measurement unit 133 does not exceed the threshold value of the second display update method (pattern 2) (No in step S214), the determination unit 132 determines the display update method as the first display update method (pattern 1) (step S216).

In a case where a display update method is determined, the display tendency measurement processing returns to step S202. Note that, until the display update processing is executed a specified number of times or more or a certain time is elapsed, the subsequent display update processing is performed only by the display update method determined in step S216 and processing of step S202 to step S207 may be omitted. Further, the subsequent display update processing may be continuously performed only by the display update method determined in step S216.

[Effects of First Embodiment]

The display control apparatus 10 according to the present embodiment described above detects changes of UI elements on a target screen, determines a display update method among a plurality of display update methods for extended UIs based on the detected changes of the UI elements, and updates display of the extended UIs by the determined display update method. Therefore, even in a case where large-scale changes of UI elements on a target screen occur or UI elements change with a high frequency, the display control apparatus according to the present embodiment described above can reduce a tightness of terminal resources and a display delay of a target screen when UI extension is applied.

Further, the display control apparatus 10 according to the present embodiment described above measures a change tendency of the UI elements from the detected changes of the UI elements, and determines a display update method by using the measured change tendency. Specifically, the display control apparatus 10 further measures at least one of a display update interval, a display update frequency, and the number of changed UI elements, and determines a display update method by using at least one of the measured display update interval, the measured display update frequency, and the measured number of changed UI elements. Therefore, it is possible to apply the display update method according to the change tendency of the target screen and to improve a display response of the extended UIs when the screen is dynamically changed.

In addition, the display control apparatus 10 according to the present embodiment described above further determines a waiting time until display of the extended UIs is updated, by using at least one of the measured display update interval, the measured display update frequency, and the measured number of changed UI elements. Therefore, it is possible to more effectively apply the display update method determined when the screen is dynamically changed and to improve a display response of the extended UIs.

[System Configuration and Others]

Each component of each apparatus that has been illustrated according to the embodiment described above is functionally conceptual, and does not necessarily have to be physically configured as illustrated. That is, a specific form of distribution and integration of individual apparatuses is not limited to the illustrated form, and all or a part of the configuration can be functionally or physically distributed and integrated in any unit according to various loads, usage conditions, and the like. Furthermore, all or any part of each processing function performed in each apparatus can be realized by a CPU and a program analyzed and executed by the CPU, or can be realized as hardware by wired logic.

Further, among the individual processes described in the embodiment described above, all or some of the processes described as being automatically performed can be manually performed, or all or some of the processes described as being manually performed can be automatically performed by a known method. In addition, the processing procedure, the control procedure, the specific name, and the information including various data and parameters that are illustrated in the document and the drawings can be freely changed unless otherwise specified.

[Program]

In addition, it is also possible to create a program in which the processing executed by the display control apparatus 10 described in the embodiment described above is described in a language that can be executed by a computer. In this case, the computer executes the program, and thus the effects similar to those of the embodiment described above can be obtained. Further, the program may be recorded in a computer-readable recording medium, and the program recorded in the recording medium may be read and executed by the computer. Thereby, processing similar to the embodiment described above may be realized.

FIG. 15 is a diagram illustrating a computer that executes a program. As exemplified in FIG. 15, a computer 1000 includes, for example, a memory 1010, a central processing unit (CPU) 1020, a hard disk drive interface 1030, a disk drive interface 1040, a serial port interface 1050, a video adapter 1060, and a network interface 1070, and these individual units are connected by a bus 1080.

As exemplified in FIG. 15, the memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090 as exemplified in FIG. 15. The disk drive interface 1040 is connected to a disk drive 1100 as exemplified in FIG. 15. For example, a removable storage medium such as a magnetic disk or an optical disk is inserted into the disk drive 1100. As exemplified in FIG. 15, the serial port interface 1050 is connected to, for example, a mouse 1110 and a keyboard 1120. As exemplified in FIG. 15, the video adapter 1060 is connected to, for example, a display 1130.

Here, as exemplified in FIG. 15, the hard disk drive 1090 stores, for example, an OS 1091, an application program 1092, a program module 1093, and program data 1094. That is, the above program is stored, for example, in the hard disk drive 1090 as a program module in which a command executed by the computer 1000 is described.

Further, pieces of various data described in the embodiment described above are stored as program data in, for example, the memory 1010 and the hard disk drive 1090. Then, the CPU 1020 reads out the program module 1093 and the program data 1094 stored in the memory 1010 and the hard disk drive 1090 to the RAM 1012 as necessary, and executes various processing procedures.

Note that the program module 1093 and the program data 1094 related to the program are not limited to being stored in the hard disk drive 1090, and may be stored in, for example, a removable storage medium, and read by the CPU 1020 via a disk drive or the like. Alternatively, the program module 1093 and the program data 1094 related to the program may be stored in another computer connected via a network (such as local area network (LAN) or a wide area network (WAN)) and read by the CPU 1020 via the network interface 1070.

The embodiment described above and modifications thereof are included in the invention described in the claims and the equivalent scope thereof, similarly to being included in the technique disclosed in the present application.

REFERENCE SIGNS LIST

10 Display control apparatus
11 Input unit
12 Output unit
13 Control unit
131 Change detection unit
132 Determination unit
133 Change tendency measurement unit
134 Display update unit
14 Storage unit
141 UI extension setting information
142 Change tendency information

The invention claimed is:

1. A display control apparatus comprising:
a change detection unit, including one or more processors, configured to detect a change of a user interface (UI) element on a target screen;
a determination unit, including one or more processors, configured to determine a display update method among a plurality of display update methods for extended UIs based on the change of the UI element detected by the change detection unit; and
a display update unit, including one or more processors, configured to update display of the extended UIs by the display update method determined by the determination unit.

2. The display control apparatus according to claim 1, further comprising:
a change tendency measurement unit, including one or more processors, configured to measure a change tendency of the UI element from the change of the UI element detected by the change detection unit,
wherein the determination unit is configured to determine a display update method by using the change tendency measured by the change tendency measurement unit.

3. The display control apparatus according to claim 2,
wherein the change tendency of the UI element measured by the change tendency measurement unit is at least one of a display update interval, a display update frequency, and a number of changed UI elements.

4. The display control apparatus according to claim 1,
wherein the determination unit is configured to determine at least one display update method among a first display update method of updating only display of an extended UI corresponding to the UI element in a case where the change of the UI element is detected, a second display update method of updating display of all extended UIs on a target screen in a case where the change of the UI element is detected and then a predetermined time is elapsed, and a third display update method of updating display of all extended UIs on a target screen by periodic polling.

5. The display control apparatus according to claim 3,
wherein the display update unit is further configured to determine a waiting time until display of the extended UIs is updated, by using at least one of the display update interval, the display update frequency, and the number of changed UI elements which are measured by the change tendency measurement unit.

6. A display control method comprising:
detecting a change of a UI element on a target screen;
determining a display update method among a plurality of display update methods for extended UIs based on the detected change of the UI element; and
updating display of the extended UIs by the determined display update method.

7. A non-transitory computer readable medium storing one or more instructions causing a computer to execute a process comprising:
detecting a change of a UI element on a target screen;
determining a display update method among a plurality of display update methods for extended UIs based on the detected change of the UI element; and
updating display of the extended UIs by the determined display update method.

8. The display control method according to claim 6, further comprising:
measuring a change tendency of the UI element from the change of the UI element; and
determining a display update method by using the change tendency.

9. The display control method according to claim 8,
wherein the change tendency of the UI element is at least one of a display update interval, a display update frequency, and a number of changed UI elements.

10. The display control method according to claim 9, comprising:
determining a waiting time until display of the extended UIs is updated, by using at least one of the display update interval, the display update frequency, and the number of changed UI elements.

11. The display control method according to claim 6, comprising:
determining at least one display update method among a first display update method of updating only display of an extended UI corresponding to the UI element in a case where the change of the UI element is detected, a second display update method of updating display of all extended UIs on a target screen in a case where the change of the UI element is detected and then a predetermined time is elapsed, and a third display update method of updating display of all extended UIs on a target screen by periodic polling.

12. The non-transitory computer readable medium according to claim 7, wherein the process comprises:
measuring a change tendency of the UI element from the change of the UI element; and
determining a display update method by using the change tendency.

13. The non-transitory computer readable medium according to claim 12,
wherein the change tendency of the UI element is at least one of a display update interval, a display update frequency, and a number of changed UI elements.

14. The non-transitory computer readable medium according to claim 13, wherein the process comprises:
determining a waiting time until display of the extended UIs is updated, by using at least one of the display update interval, the display update frequency, and the number of changed UI elements.

15. The non-transitory computer readable medium according to claim 7, wherein the process comprises:
determining at least one display update method among a first display update method of updating only display of an extended UI corresponding to the UI element in a case where the change of the UI element is detected, a second display update method of updating display of all extended UIs on a target screen in a case where the change of the UI element is detected and then a predetermined time is elapsed, and a third display update method of updating display of all extended UIs on a target screen by periodic polling.

* * * * *